United States Patent
Holleman et al.

(10) Patent No.: US 9,770,769 B2
(45) Date of Patent: Sep. 26, 2017

(54) ORBITAL DRILLING SYSTEM AND ASSOCIATED METHODS AND APPARATUSES

(71) Applicant: The Boeing Company, Chicago, IL (US)

(72) Inventors: Wesley E. Holleman, Long Beach, CA (US); Nicholas R. Farrell, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/004,769

(22) Filed: Jan. 22, 2016

(65) Prior Publication Data

US 2017/0209946 A1 Jul. 27, 2017

(51) Int. Cl.
*B23C 5/24* (2006.01)
*B23C 3/02* (2006.01)
*B23C 5/10* (2006.01)

(52) U.S. Cl.
CPC .............. *B23C 5/2458* (2013.01); *B23C 3/02* (2013.01); *B23C 5/109* (2013.01); *B23C 2210/62* (2013.01); *B23C 2220/52* (2013.01); *Y10T 409/303808* (2015.01); *Y10T 409/307616* (2015.01)

(58) Field of Classification Search
CPC .............. B23C 2220/52; B23C 5/2462; Y10T 409/303808; Y10T 409/306776; Y10T 409/30756; Y10T 409/307616
See application file for complete search history.

(56) References Cited

U.S. PATENT DOCUMENTS

| 1,150,555 | A | * | 8/1915 | Thau | B23C 5/2221 |
| | | | | | 407/35 |
| 1,484,207 | A | * | 2/1924 | Campbell | B23C 5/242 |
| | | | | | 407/45 |
| 1,516,172 | A | | 11/1924 | Berg | |
| 2,069,299 | A | * | 2/1937 | Bartholomew | B23Q 1/4809 |
| | | | | | 409/199 |
| 3,526,167 | A | * | 9/1970 | Escobedo | B23C 3/32 |
| | | | | | 409/200 |

(Continued)

FOREIGN PATENT DOCUMENTS

DE 2105578 A1 * 3/1972 ............... B23C 7/00
GB 1323272 A 7/1973

(Continued)

OTHER PUBLICATIONS

European Search Report for European Patent Application No. 16194970.6 dated Jun. 26, 2017.

*Primary Examiner* — Daniel Howell
(74) *Attorney, Agent, or Firm* — Kunzler Law Group, PC

(57) ABSTRACT

Described herein is an orbital drilling system that includes an orbital drilling machine and a cutter. The orbital drilling machine includes a spindle and an eccentric rotation mechanism. The spindle is rotatable about a cutter axis. The eccentric rotation mechanism is coupled to the spindle and configured to orbit the spindle about an orbital axis, offset from the cutter axis. The cutter is co-rotatably coupled to the spindle and comprises a plurality of cutting edges, collectively defining a cutting diameter of the cutter. The cutting diameter of the cutter is adjustable.

21 Claims, 10 Drawing Sheets

(56) References Cited

U.S. PATENT DOCUMENTS

| | | | | |
|---|---|---|---|---|
| 3,530,745 A | * | 9/1970 | Milewski | B23B 29/03457 408/158 |
| 3,540,347 A | * | 11/1970 | Randall | B23Q 5/046 408/21 |
| 3,700,345 A | * | 10/1972 | Schubert | B23B 29/03478 408/143 |
| 4,611,516 A | | 9/1986 | Hochmuth et al. | |
| 5,197,836 A | * | 3/1993 | Crivellin | B23Q 1/5481 409/200 |
| 5,816,755 A | * | 10/1998 | Thelin | B23C 3/00 408/1 R |
| 6,007,281 A | * | 12/1999 | Eriksson | B23B 35/00 408/1 R |
| 6,343,902 B1 | * | 2/2002 | Nishikawa | B23C 3/02 407/31 |
| 6,533,508 B1 | * | 3/2003 | Nonaka | B23C 3/04 409/132 |
| 6,979,154 B2 | * | 12/2005 | Mina | B23C 5/109 407/113 |
| 8,152,421 B2 | * | 4/2012 | Yagishita | B23C 3/02 409/132 |
| 8,256,092 B1 | * | 9/2012 | Woodruff | B23B 41/12 29/557 |
| 8,870,499 B2 | * | 10/2014 | Harif | B23B 27/12 407/102 |
| 9,381,578 B2 | * | 7/2016 | De Mattia | B23B 39/16 |
| 2002/0170178 A1 | * | 11/2002 | Zackrisson | B23B 51/10 30/34.1 |
| 2003/0017017 A1 | * | 1/2003 | Linderholm | B23Q 1/4885 409/190 |
| 2003/0049085 A1 | * | 3/2003 | Pettersson | B23B 49/02 409/132 |
| 2012/0294689 A1 | * | 11/2012 | Yagista | B23B 51/0036 409/200 |

FOREIGN PATENT DOCUMENTS

| | | | | |
|---|---|---|---|---|
| GB | 2032820 A | | 5/1980 | |
| GB | 2084056 A | | 4/1982 | |
| JP | S56126504 A | | 4/1981 | |
| JP | 56126504 A | * | 10/1981 | B23C 5/2458 |
| JP | 62107913 A | * | 5/1987 | |
| JP | 62193717 A | * | 8/1987 | |
| JP | 01316110 A | * | 12/1989 | B23B 27/007 |
| JP | 03073261 A | * | 3/1991 | |
| JP | 07004684 B2 | * | 1/1995 | |
| JP | 11114759 A | * | 4/1999 | |
| JP | 2008272851 A | * | 11/2008 | |

* cited by examiner

ORBITAL DRILLING SYSTEM AND ASSOCIATED METHODS AND APPARATUSES

FIELD

This disclosure relates generally to orbital drilling systems for drilling holes, and more particularly to an orbital drilling system with a fixed offset and adjustable diameter cutter.

BACKGROUND

Orbital drilling machines are used to cut holes in workpieces by orbiting a rotating cutter about an orbital axis. The holes cut by orbital drilling machines have a hole diameter that is equal to the cutting diameter of the cutter plus an offset between the cutter and the orbital axis. Generally, orbital drilling machines provide some advantages over conventional drilling machines, such as improved hole quality, better evacuation of drill debris from hole-site, and cooler drilling temperatures.

Conventional orbital drilling machines facilitate the cutting of holes with various hole diameters by using a cutter with a non-adjustably fixed cutting diameter and adjusting the offset between the cutter and the orbital axis. The offset adjustment mechanisms employed by conventional orbital drilling machines are often large, complex, expensive, weak, and unreliable.

SUMMARY

The subject matter of the present application has been developed in response to the present state of the art, and in particular, in response to the shortcomings of conventional orbital drilling systems, that have not yet been fully solved by currently available techniques. Accordingly, the subject matter of the present application has been developed to provide an orbital drilling system, and associated methods and apparatuses, that overcome at least some of the above-discussed shortcomings of prior art techniques.

According to one embodiment, an orbital drilling system includes an orbital drilling machine and a cutter. The orbital drilling machine includes a spindle and an eccentric rotation mechanism. The spindle is rotatable about a cutter axis. The eccentric rotation mechanism is coupled to the spindle and configured to orbit the spindle about an orbital axis, offset from the cutter axis. The offset between the cutter axis and the orbital axis can be non-adjustably fixed. The cutter is co-rotatably coupled to the spindle and comprises a plurality of cutting edges, collectively defining a cutting diameter of the cutter. The cutting diameter of the cutter is adjustable.

In some implementations of the orbital drilling system, the cutter further includes a body and a plurality of inserts adjustably fixed to the body. Each of the plurality of inserts defines one of the cutting edges. Moreover, each of the plurality of inserts is radially adjustable relative to the body to adjust the cutting diameter of the cutter.

According to certain implementations of the orbital drilling system, the cutter further comprises a manual adjustment mechanism, configured to manually radially adjust the plurality of inserts relative to the body.

In certain implementations of the orbital drilling system, the manual adjustment mechanism includes a cam. The cam includes a non-round engagement surface, configured to engage the plurality of inserts, upon rotation of the cam in a first rotational direction, urge the plurality of inserts radially outwardly relative to the body of the cutter and, upon rotation of the cam in a second rotational direction, opposite the first rotational direction, allow the plurality of inserts to be moved radially inwardly relative to the body of the cutter.

According to some implementations of the orbital drilling system, the manual adjustment mechanism includes a wedge. The wedge includes a tapered surface, configured to engage the plurality of inserts, upon translational movement of the wedge relative to the body in a first translational direction, parallel to the cutter axis, urge the plurality of inserts radially outwardly relative to the body of the cutter and, upon translational movement of the wedge relative to the body in a second translational direction, opposite the first translational direction, allow the plurality of inserts to be moved radially inwardly relative to the body of the cutter.

In some implementations of the orbital drilling system, the manual adjustment mechanism includes a plurality of shims, each positionable between a respective one of the plurality of inserts and the body to support the insert following a manual radial adjustment of the insert. The plurality of shims each has a dimension equal to a desired radial adjustment of the plurality of inserts.

According to certain implementations of the orbital drilling system, the cutter further includes a plurality of fasteners, each configured to adjustably fix a respective one of the plurality of inserts to the body of the cutter. Each of the plurality of inserts can include a slot, through which a respective one of the plurality of fasteners extends to adjustably fix the insert to the body of the cutter. Moreover, each fastener can move translationally along the slot of a respective insert as the insert is radially adjusted relative to the body.

In some implementations of the orbital drilling system, the cutter further includes an automated adjustment mechanism, configured to automatically radially adjust the plurality of inserts relative to the body of the cutter. The automated adjustment mechanism can include an electronically-controlled actuator, coupled with the plurality of inserts and selectively operable to radially move the plurality of inserts relative to the body of the cutter. Additionally, the automated adjustment mechanism can further include a wedge, including a tapered surface configured to engage the plurality of inserts, upon translational movement of the wedge relative to the body in a first translational direction, parallel to the cutter axis, urge the plurality of inserts radially outwardly relative to the body of the cutter and, upon translational movement of the wedge relative to the body in a second translational direction, opposite the first translational direction, urge the plurality of inserts to be moved radially inwardly relative to the body of the cutter. The wedge is coupled to the electronically-controlled actuator and translationally movable relative to the body via selective operation of the electronically-controlled actuator.

According to some implementations of the orbital drilling system, the automated adjustment mechanism further includes a control module, operatively coupled with the electronically-controlled actuator. The control module is configured to direct the electronically-controlled actuator to radially move the plurality of inserts relative to the body of the cutter. The control module can be operatively coupled with the orbital drilling machine to control rotation of the spindle and cutter about the cutter axis and orbital rotation of the spindle about the orbital axis. Furthermore, the control module can be configured direct the electronically-controlled actuator to radially move the plurality of inserts relative to the body of the cutter such that the cutter has a first cutting diameter, control rotation of the spindle and cutter with the first cutting diameter about the cutter axis and orbital rotation of the spindle about the orbital axis to form a hole in a workpiece having a first hole diameter greater than the first cutting diameter, direct the electronically-controlled actuator to radially move the plurality of inserts relative to the body of the cutter such that the cutter has a second cutting diameter larger than the first cutting diameter, and control rotation of the spindle and cutter with the second cutting diameter about the cutter axis and orbital rotation of the spindle about the orbital axis to enlarge the hole in the workpiece from the first hole diameter to a second hole diameter larger than the first hole diameter.

In yet another embodiment, a method of forming a hole in a workpiece includes providing an offset between an orbital axis, about which a cutter orbits, and a cutter axis, about which the cutter rotates. In some implementations, the method may further include non-adjustably fixing the offset between the orbital axis and the cutter axis. The method also includes adjusting a cutting diameter of the cutter and rotating the cutter about the cutter axis to cut material in the workpiece. While rotating the cutter about the cutter axis to cut material in the workpiece, the method includes orbiting the cutter about the orbital axis to form a hole in the workpiece having a first hole diameter greater than the cutting diameter.

According to some implementations of the method, the cutter includes a plurality of cutting edges, collectively defining the cutting diameter of the cutter. Moreover, adjusting the cutting diameter of the cutter can include manually moving the plurality of cutting edges radially away from or radially towards the cutter axis. Alternatively, or additionally, adjusting the cutting diameter of the cutter can include automatically moving the plurality of cutting edges radially away from or radially towards the cutter axis. Adjusting the cutting diameter of the cutter may include moving the plurality of cutting edges radially away from or radially towards the cutter axis on-the-fly while the cutter rotates about the cutter axis.

In certain implementations of the method, the cutting diameter of the cutter is a first cutting diameter. The method may further include adjusting the first cutting diameter of the cutter to a second cutting diameter different than the first cutting diameter. Additionally, the method can include, while rotating the cutter about the cutter axis to cut material in the workpiece, orbiting the cutter about the orbital axis to form a hole in the workpiece having a second hole diameter greater than the second cutting diameter and different than the first hole diameter.

In another embodiment, a cutter for use with an orbital drilling machine to form a hole in a workpiece having a hole diameter is disclosed. The orbital drilling machine includes a cutter axis offset relative to an orbital axis. The offset can be adjustable or non-adjustable. The cutter includes a body and a plurality of inserts adjustably fixed to the body. Each of the plurality of inserts defines one of a plurality of cutting edges, collectively defining a cutting diameter of the cutter that is smaller than the hole diameter. The plurality of inserts are radially adjustable relative to the body to adjust the cutting diameter.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
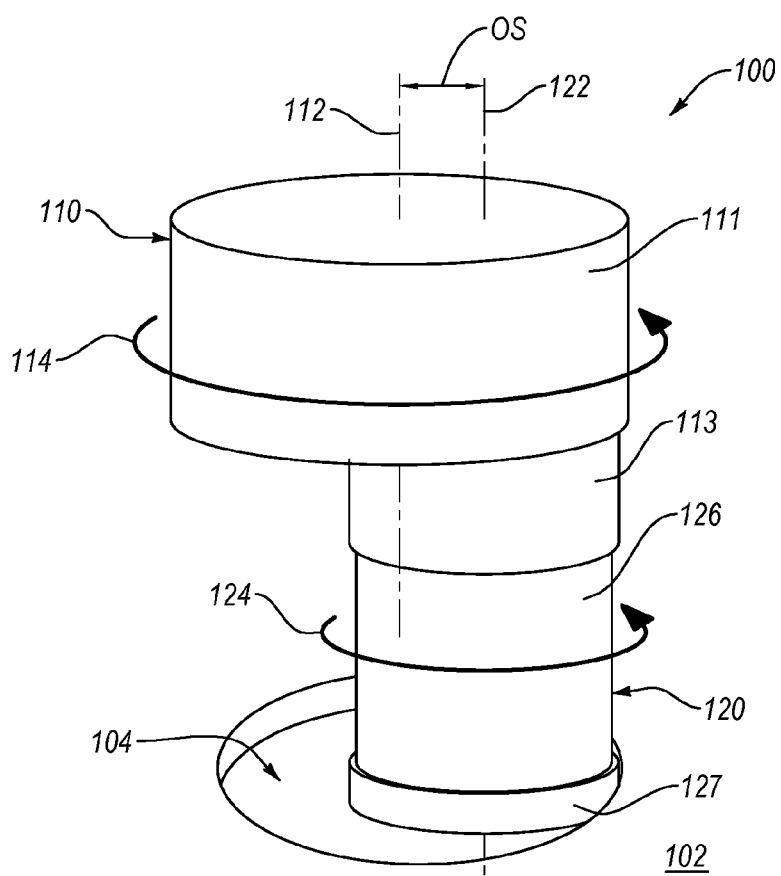
FIG. 1 is a schematic perspective view of an orbital drilling system, according to one or more embodiments of the present disclosure.
Figure 2:
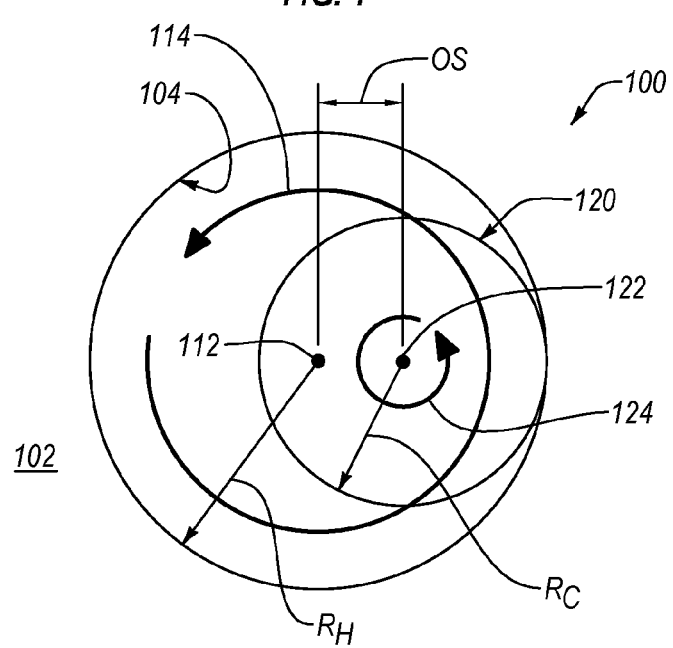
FIG. 2 is a schematic top plan view of a cutter of the orbital drilling system of FIG. 1, according to one or more embodiments of the present disclosure.

Referring to FIGS. 1 and 2, according to one embodiment, an orbital drilling system 100 includes an orbital drilling machine 110 and a cutter 120, coupled to the orbital drilling machine 110. Generally, the orbital drilling system 100 is operable to form (e.g., drill or cut) a hole 104 in a workpiece 102. The orbital drilling machine 110 includes an eccentric rotation mechanism 111 that rotates about an orbital axis 112 in rotational direction 114. Depending on the configuration of the eccentric rotation mechanism 111, the orbital axis 112 may be concentric with a central axis of the eccentric rotation mechanism 111. The orbital drilling machine 110 also includes a spindle 113 coupled to the eccentric rotation mechanism at a location offset from the orbital axis 112. Accordingly, rotation of the eccentric rotation mechanism 111 about the orbital axis 112 causes the spindle 113 to orbit about the orbital axis 112. The spindle 113 is rotatable about a cutter axis 122 in rotational direction 124 independently of the rotation of the eccentric rotation mechanism 111 about the orbital axis 112. The cutter axis 122 is spaced apart or offset from the orbital axis 112 by the offset OS. Therefore, the cutter axis 122 orbits about the orbital axis 112 with an orbital radius equal to the offset OS. Although not shown, a spindle motor, coupled to the eccentric rotation mechanism 111, is operable to rotate the spindle 113 about the cutter axis 122. The spindle motor can be any of various types of motors, such as electric motors, electromagnetic motors, pneumatic motors, hydraulic motors, and the like.

Unlike conventional orbital drilling machines, the offset OS between the orbital axis 112 and the cutter axis 122 is non-adjustably fixed. In other words, the offset OS between the orbital axis 112 and the cutter axis 122 is not adjustable. Because the offset OS between the orbital axis 112 and the cutter axis 122 is non-adjustably fixed, the large, complex, expensive, weak, and often unreliable offset adjustment mechanisms, required to adjust the offset OS between the orbital axis and cutter axis, on conventional orbital drilling machines are not needed and not included on the orbital drilling machine 110. Without an offset adjustment mechanism, the orbital drilling machine 110 can be smaller, less complex, less expensive, stronger, and more reliable than conventional orbital drilling machines.

The orbital drilling system further includes a cutter 120 co-rotatably coupled to the spindle 113. Generally, the spindle 113 is configured to rotate the cutter 120 about the cutter axis 122. In other words, because the cutter 120 is co-rotatably coupled to the spindle 113, as the spindle 113 rotates about the cutter axis 122, the cutter 120 correspondingly rotates about the cutter axis 122. Moreover, the cutter 120 is coupled to the spindle 113 such that the cutter axis 122 is concentric with a central axis or symmetrical axis of the cutter 120. In one example, the cutter 120 is co-rotatably coupled to the spindle 113 using a precision drill chuck, which non-releasably secures the cutter 120 on one end (e.g., using heat expansion techniques) and includes a conventional spindle interface on the other end to co-rotatably engage the spindle 113. In other examples, the spindle 113 includes a conventional chuck to releasably secure the cutter 120 to the spindle 113.

The cutter 120 includes a body 126 and a cutting portion 127 coupled to the body 126. Generally, the cutting portion 127 includes at least one cutting edge configured to cut material from the workpiece 102 as the cutter 120 is rotated about the cutter axis 122. The cutting portion 127 of the cutter 120 defines a cutting diameter. The cutting diameter of the cutting portion 127 is defined as two times the cutting radius of the cutting portion, which is equal to the distance between the cutter axis 122 and the at least one cutting edge. As will be described in more detail below, with reference to particular implementations of a cutter, the cutting diameter of the cutting portion 127 of the cutter 120 is adjustable. Accordingly, contrary to conventional orbital drilling systems, which rely an orbital drilling machine, with an adjustable offset between an orbital axis and a cutter axis, and a cutter with a non-adjustably fixed cutting diameter to form holes of various sizes in workpieces, orbital drilling system 100 includes an orbital drilling machine 110, with a non-adjustable fixed offset between the orbital axis 112 and the cutter axis 122, and a cutter with an adjustable cutting diameter to form holes of various sizes in workpieces.

To form a hole 104 in a workpiece 102, the orbital drilling system 100 concurrently rotates the eccentric rotation mechanism 111 about the orbital axis 112 and rotates the cutter 120 about the cutter axis 122, as the cutter 120 is fed axially through the workpiece 102 along a feed axis parallel to the orbital axis 112 and cutter axis 122. Generally, the eccentric rotation mechanism 111 includes an element, rotatable about the orbital axis 112, that retains the spindle 113 in a non-adjustable position spaced apart (e.g., offset) from the orbital axis 112 by the offset OS and rotates the spindle 113 about the orbital axis 112. In one example, the element is a shaft-like element, rotated about the orbital axis 112 by a motor, and the spindle 113 is retained in the non-adjustable position offset from the orbital axis 112 by an arm, or other spacing means, coupled to the shaft-like element and extending substantially transversely away from the orbital axis 112. Rotation of the cutter 120 about the cutter axis 122 removes material from workpiece 102 and rotation of the eccentric rotation mechanism 111 about the orbital axis 112 causes the cutter 120 to orbit around the orbital axis 112 as it removes material. Accordingly, the hole 104 formed by the orbital drilling system 100 is concentric with the orbital axis 112 and has a radius $R_H$ is equal to the offset OS plus a cutting radius $R_C$ of the cutting portion 127 of the cutter 120. In other words, the hole 104 is centered on the orbital axis 112 and has a diameter equal to the offset OS plus two times the cutting radius $R_C$ of the cutting portion 127 of the cutter 120.

Figure 3:
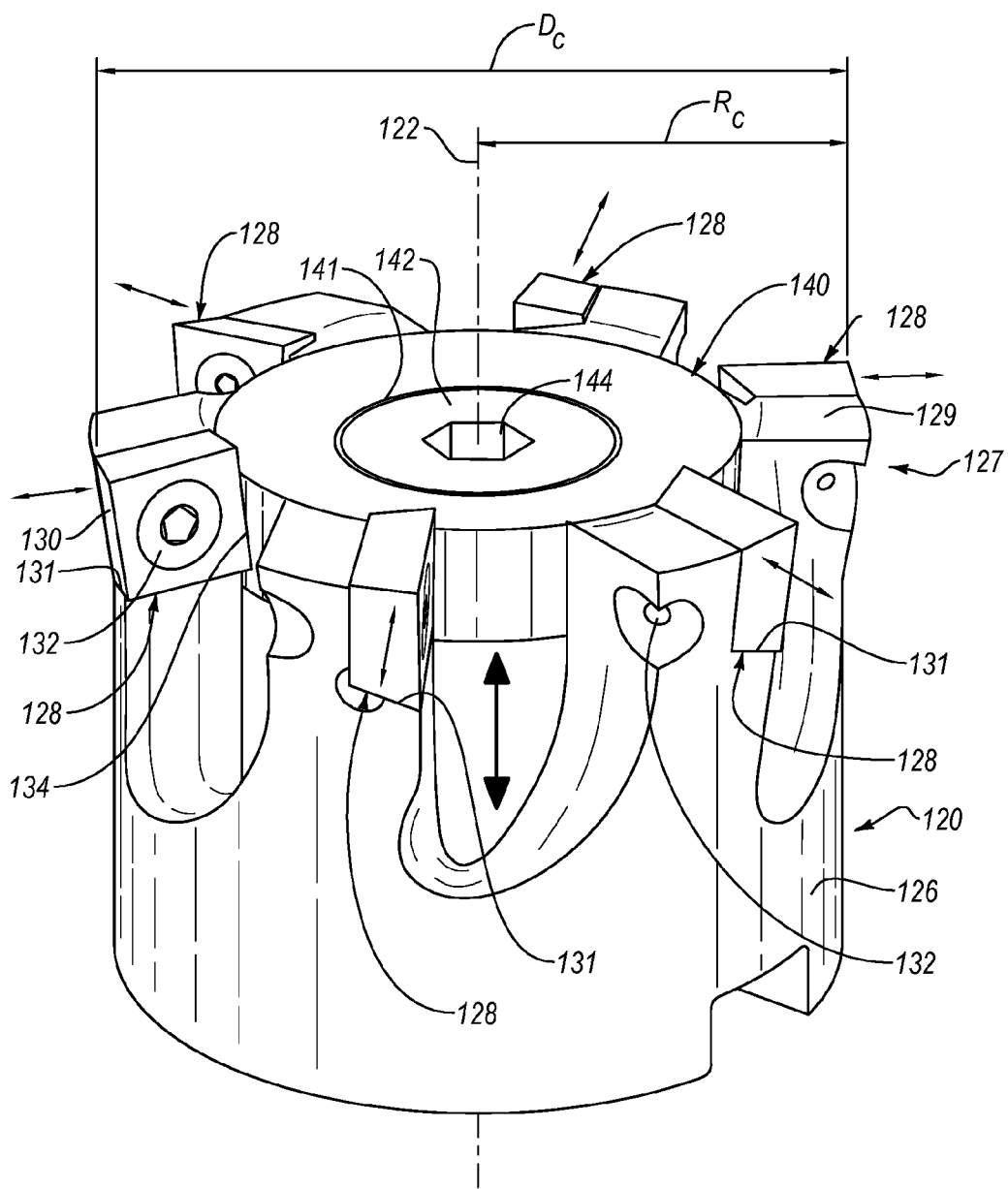
FIG. 3 is a perspective view of a detail of a cutter, according to one or more embodiments of the present disclosure.
Figure 4:
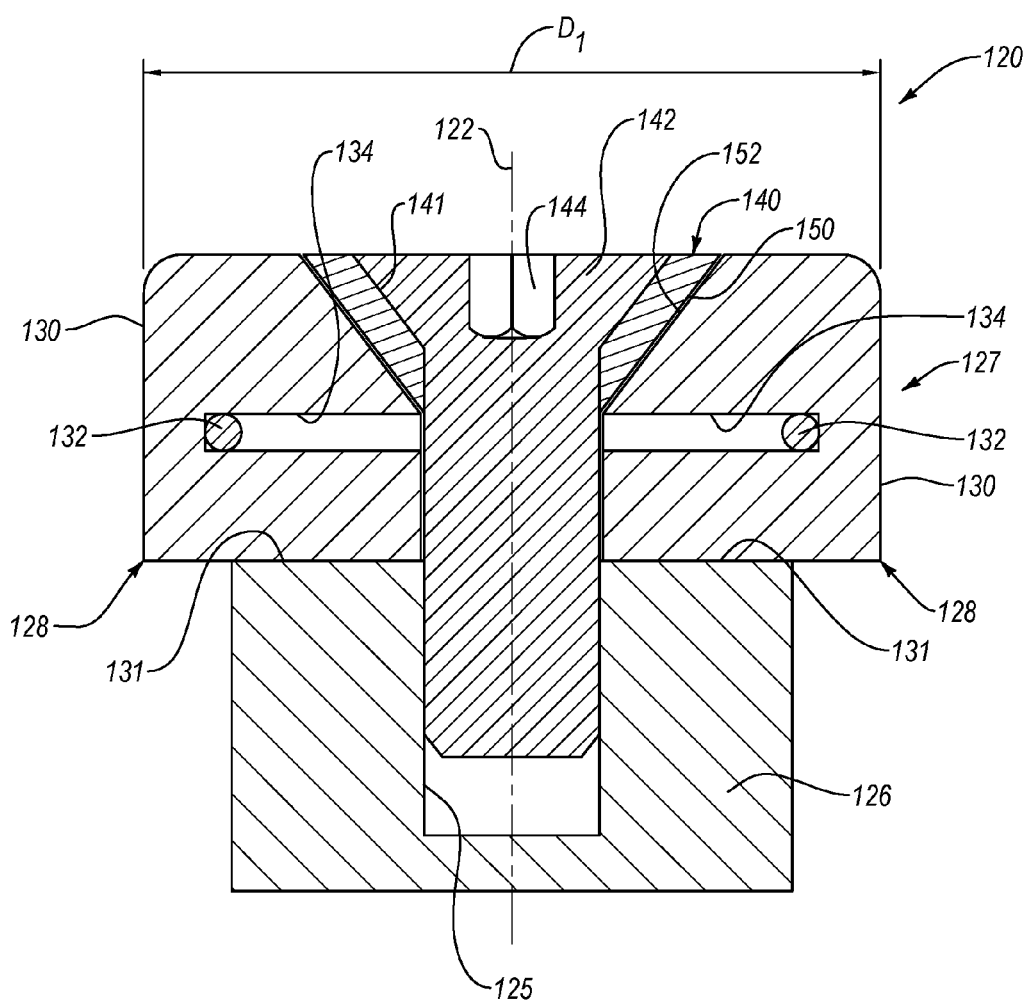
FIG. 4 is a schematic cross-sectional side elevation view of a cutter, shown with inserts in one radial position, according to one or more embodiments of the present disclosure.
Figure 5:
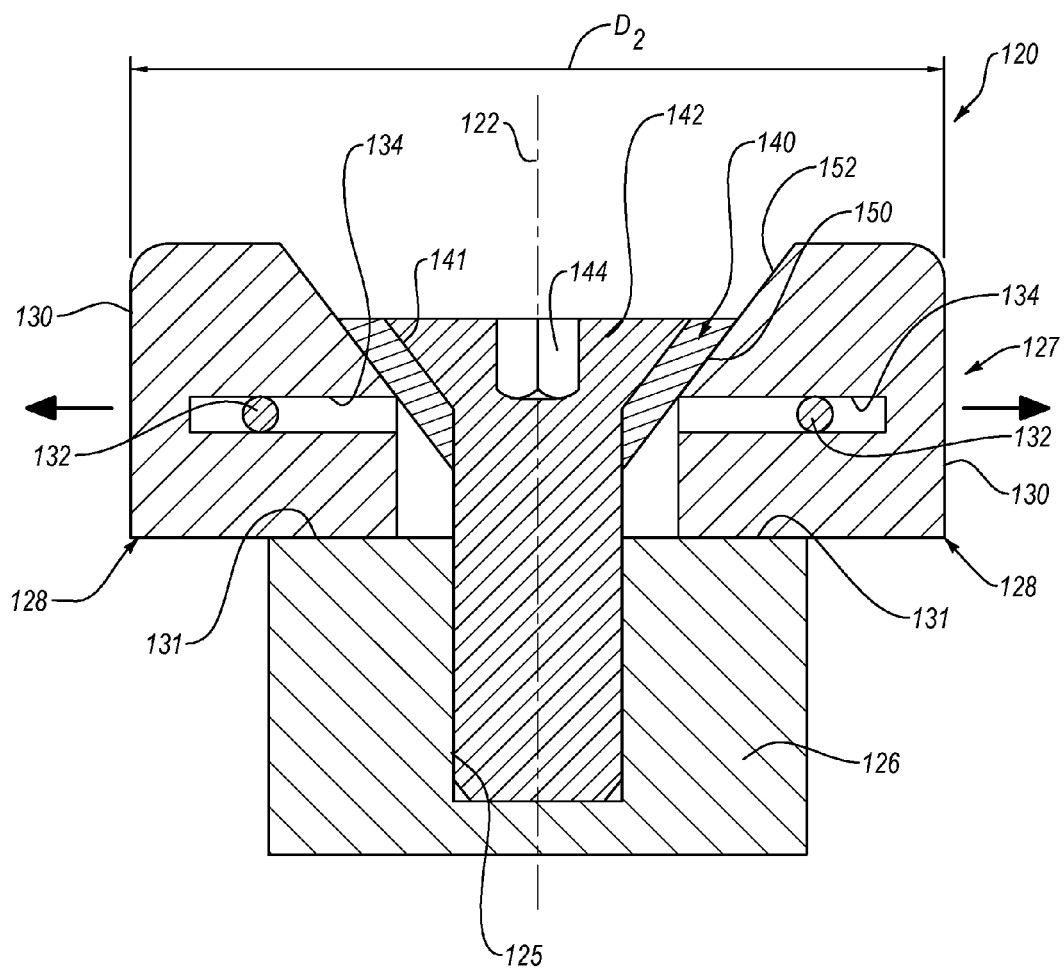
FIG. 5 is a schematic cross-sectional side elevation view of the cutter of FIG. 4, shown with the inserts in another radial position, according to one or more embodiments of the present disclosure.
Figure 8:
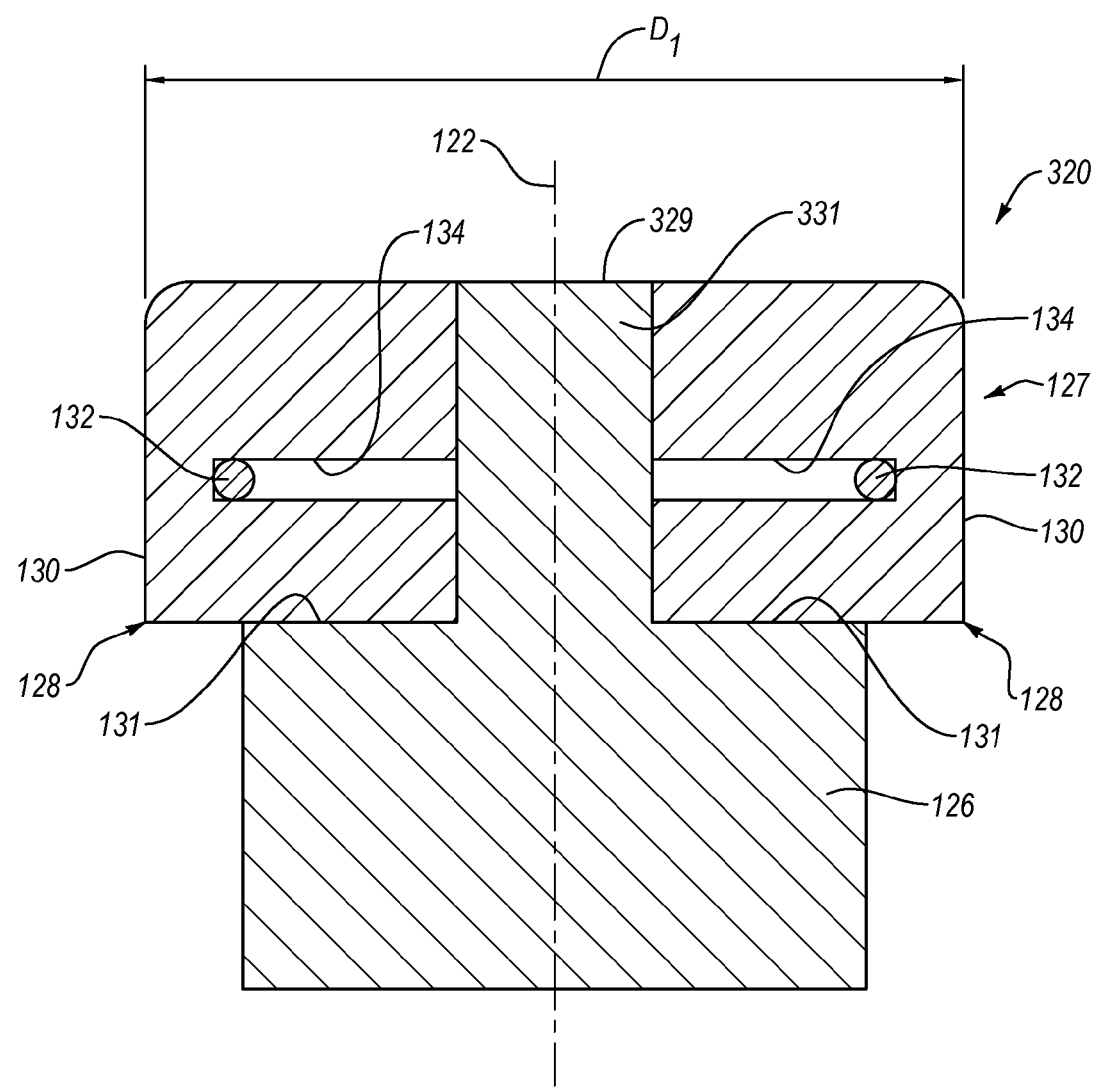
FIG. 8 is a schematic cross-sectional side elevation view of a cutter, shown with inserts in one radial position, according to one or more embodiments of the present disclosure.
Figure 9:
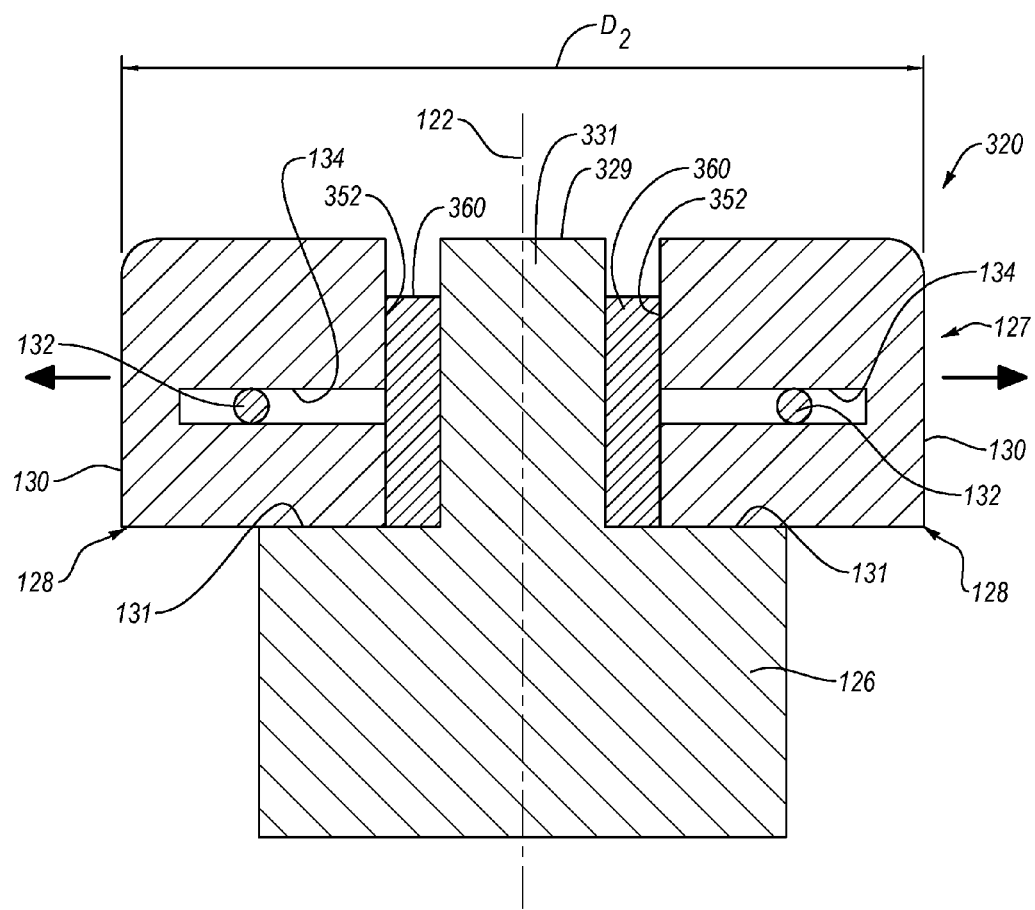
FIG. 9 is a schematic cross-sectional side elevation view of the cutter of FIG. 8, shown with the inserts in another radial position, according to one or more embodiments of the present disclosure.

Referring to FIGS. 3-5, according to one embodiment, the cutting portion 127 of the cutter 120 includes a plurality of cutting edges 130 each formed on one of a plurality of inserts 128. The inserts 128 can be made from any of various materials conducive to cutting holes in softer materials. For example, in some implementations, inserts 128 are made from a carbide compound. The inserts 128 are adjustably fixed to the body 126 of the cutter 120 and adjustable to change the cutting radius $R_C$, equal to the distance between the cutter axis 122 and a cutting edge 130 of an insert 128, of the cutting portion 127 and thus the cutting diameter $D_C$, equal to two times the cutting radius $R_C$ or the distance between the cutting edges 130 of symmetrically opposing inserts 128, of the cutting portion. The inserts 128 are positioned an equal distance apart from each other circumferentially about a tip 129 or end of the body 126. The inserts 128 can have any of various shapes and sizes. In some examples, such as shown in FIGS. 8 and 9, the inserts 128 are substantially square shaped. In contrast, in the illustrated examples of FIGS. 3-5, 10 and 11, the inserts 128 are uniquely shaped to have a radially-inward tapered surface 152. Each of the inserts 128 in the illustrated embodiments has a substantially straight cutting edge 130 defining a radially outermost edge of the inserts. However, in other embodiments, the cutting edges 130 of the inserts 128 can be non-straight, such as rounded, curved, or jagged.

Each insert 128 is adjustably fixed to the body 126 of the cutter 120 by, at least in part, a respective fastener 132 that extends through a slot 134 formed in the insert 128 and engages the body 126. The fastener 132 can be loosened, to allow the insert 128 to be moved radially inwardly and outwardly relative to the cutter axis 122, or tightened, to fix the insert 128 in place relative to the cutter axis 122. The fastener 132 can be any of various fasteners known in the art. For example, in one implementation, the fastener 132 is a bolt with a head and an externally-threaded shank, configured to engage an internally-threaded aperture (not shown) formed in the body 126 of the cutter 120. Tightening the fastener 132 may include threadably engaging the shank with the aperture formed in the body 126 until the head securely clamps down on the insert 128. As shown in FIG. 5, with the fastener 132 loosened, the insert 128 is able to move radially relative to the cutter axis 122, as indicated by directional arrows. Radial movement is in a direction substantially perpendicular to the cutter axis 122. Movement of the insert 128 is limited to radially-directed translational movement, via engagement of the fastener 132 with the slot 134 as the insert 128 moves, and via engagement of insert 128 with a step 131, which constrains rotation of the insert 128, formed in the body 126 of cutter 120. Referring to FIGS. 4 and 5, as the insert 128 moves radially relative to the cutter axis 122, a portion of the fastener 132 remains engaged with the slot 134 and moves translationally along the slot 134. The step 131 of the body 126 also provides support to the insert 128 in a direction parallel to the cutter axis 122 or perpendicular to the radial direction.

The inserts 128 of the cutter of the present disclosure can be radially adjusted manually, via a manual adjustment mechanism, or automatically, via an automated adjustment mechanism. According to one embodiment, as illustrated in FIGS. 3-5, the manual adjustment mechanism of the cutter 120 includes a wedge 140 that is translationally movable along (e.g., parallel to) the cutter axis 122 to radially and concurrently move the inserts 128 relative to the cutter axis 122. The wedge 140 includes a tapered surface 150 that converges in a direction extending along the body 126 from the tip 129 of the body 126. Additionally, the manual adjustment mechanism includes any of various features for selectively translationally moving the wedge 140 along the cutter axis 122. In one example, the manual adjustment mechanism includes a fastener 142 that threadably engages an aperture 125, formed in the body 126 and coaxial with the cutter axis 122. The fastener 142 includes a shank that extends through a through-hole 141 formed in the wedge 140 and includes a head, larger than the smallest diameter of the through-hole, that engages the through-hole 141, or the wedge 140 adjacent the through-hole. As the fastener 142 is rotated relative to the body 126, the threaded engagement between the fastener 142 and the aperture 125 causes the fastener 142 to translationally move along the cutter axis 122 in a direction dependent on the rotational direction of the fastener 142 relative to the body 126. Rotation of the fastener 142 relative to the body 126 can be facilitated by a tool engagement recess 144, formed in the head of the fastener 142 and configured to receive a tool (e.g., screwdriver, hand drill, etc.) for rotating the fastener 142.

Although the cutter 120 is shown to use a fastener 142, coaxial with the cutter axis 122, to move the wedge 140 along the cutter axis 122, in other embodiments, other methods and features can be used to manually move the wedge 140 along the cutter axis 122 without departing from the essence of the present disclosure. For example, a worm drive may be used to manually move the wedge 140, where the worm drive includes a worm shaft, secured to the wedge 140, and worm gear, engaged with the worm shaft to translationally move the worm shaft when rotated.

Translational movement of the fastener 142 in a downward direction, as viewed in FIGS. 4 and 5, causes the head of the fastener 142 to engage the wedge 140 and drive the wedge 140 downward relative to the body 126. As the wedge 140 is driven downwardly relative to the body, the tapered surface 150 of the wedge 140 engages the tapered surfaces 150 of the inserts 128. Because the inserts 128 are prevented from downward movement, engagement between the tapered surface 150 of the wedge 140 and the tapered surfaces 152 of the inserts 128 urges (e.g., forces or drives) the inserts 128 radially outwardly as shown in FIG. 5. In this manner, radially outward adjustment of the position of the inserts 128 can be performed evenly and concurrently. Furthermore, as the inserts 128 are radially outwardly adjusted, the cutting diameter of the cutter 120 increases from a first diameter $D_1$ to a second diameter $D_2$. After the inserts 128 are radially outwardly adjusted to achieve a desired enlarged cutting diameter, the fasteners 132 can be tightened to retain the inserts 128 in place.

Translational movement of the fastener 142 in an upward direction, as viewed in FIGS. 4 and 5, causes the head of the fastener 142 to disengage the wedge 140 and allow the wedge 140 to move in the upward direction relative to the body 126. Because the wedge 140 is allowed to move in the upward direction, the tapered surface 150 of the wedge 140 does not prevent radially inward movement of the inserts 128 such that the inserts 128 are allowed to be radially inwardly adjusted. As the inserts 128 are radially inwardly adjusted, the cutting diameter of the cutter 120 decreases. In some implementations, the cutter 120 includes biasing elements (not shown) configured to bias the inserts 128 radially inwardly, such that the biasing elements cause the inserts 128 to move radially inwardly and the wedge to move upwardly as the fastener 142 moves in the upward direction. After the inserts 128 are radially inwardly adjusted to achieve a desired reduced cutting diameter, the fasteners 132 can be tightened to retain the inserts 128 in place.

Due to the radially inwardly directed force imparted to the inserts 128 by the workpiece 102 as the workpiece is being cut by the inserts, in some embodiments, the cutter 120 provides radial support to prevent the inserts 128 from inadvertently moving radially inwardly due to the radially inwardly directed force. According to one embodiment, the tapered surface 150 of the wedge 140 remains engaged with the tapered surfaces 152 of the inserts 128 as the inserts 128 are radially adjusted so as to provide radial support to the inserts 128 as the inserts 128 are radially adjusted.

Figure 6:
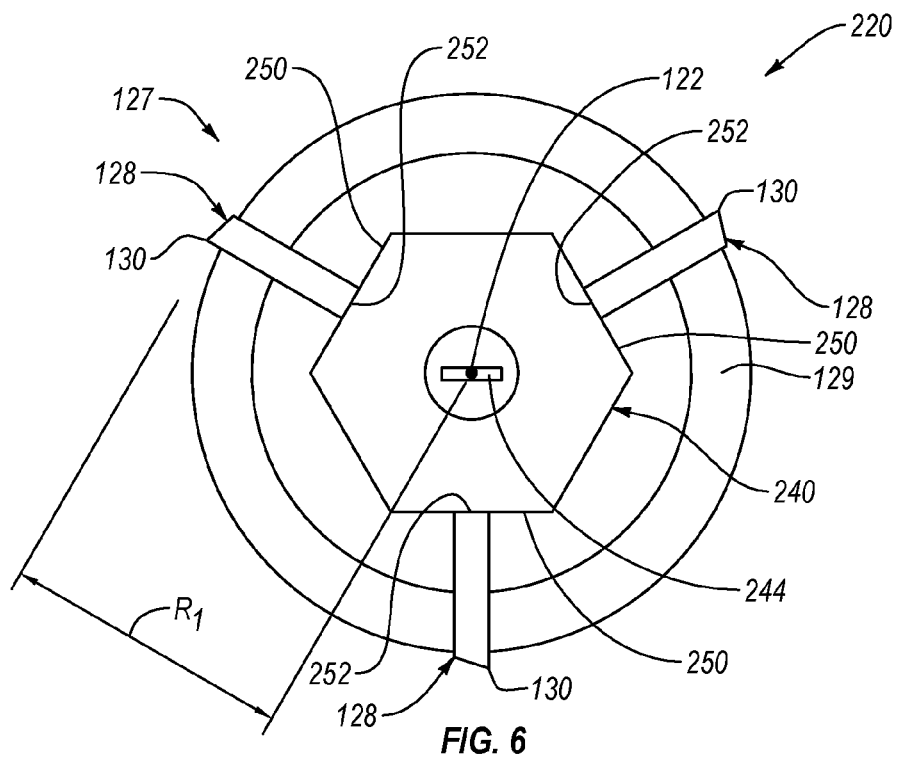
FIG. 6 is a schematic top plan view of a cutter, shown with inserts in one radial position, according to one or more embodiments of the present disclosure.
Figure 7:
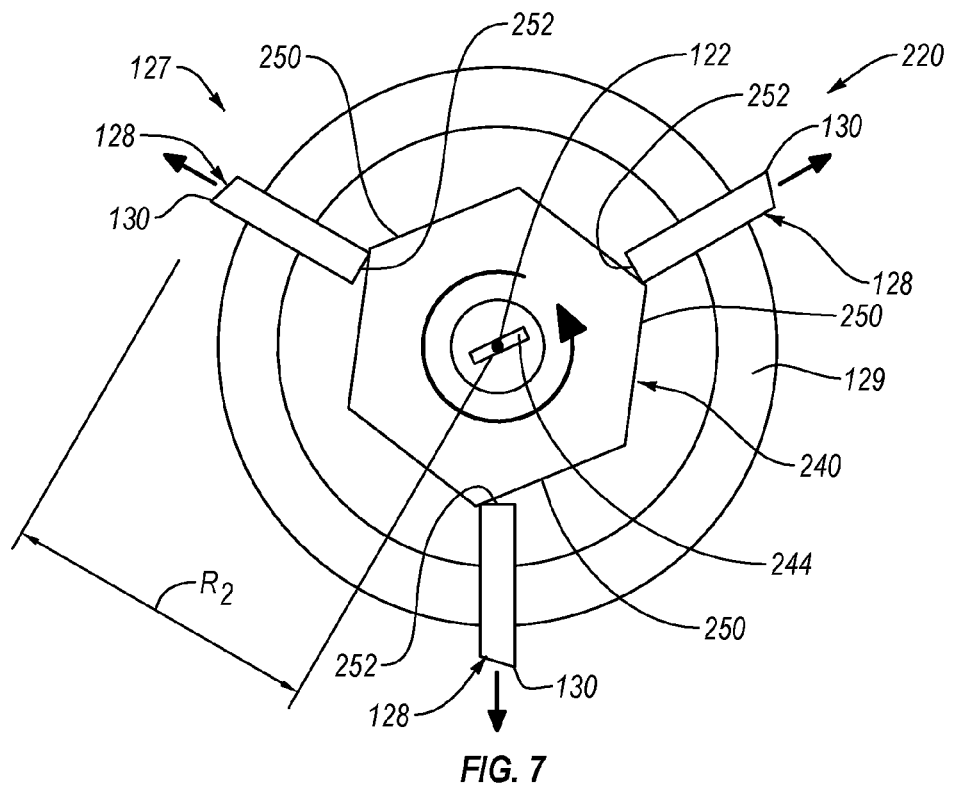
FIG. 7 is a schematic top plan view of the cutter of FIG. 6, shown with the inserts in another radial position, according to one or more embodiments of the present disclosure.

Referring to FIGS. 6 and 7, according to one embodiment, the cutting portion 127 of the cutter 220 also includes a plurality of cutting edges 130 each formed on one of a plurality of inserts 128. The inserts 128 are adjustably fixed to the body 126 of the cutter 220 and adjustable to change the cutting radius or cutting diameter of the cutter 220. The inserts 128 are positioned an equal distance apart from each other circumferentially about a tip 129 or end of the body 126. The inserts 128 each has a radially-inward surface 252.

Each insert 128 can be adjustably fixed to the body 126 of the cutter 220 by, at least in part, a respective fastener (not shown) that extends through a slot formed in the insert 128 and engages the body 126, as described above with reference to FIGS. 3-5. Accordingly, the fastener can be loosened to allow the insert 128 to be moved radially inwardly and outwardly relative to the cutter axis 122, or tightened to fix the insert 128 in place relative to the cutter axis 122.

According to one embodiment, as illustrated in FIGS. 6 and 7, a manual adjustment mechanism of the cutter 220 includes a cam 240 that is rotationally coupled to the body 126 of the cutter 220. The cam 240 is rotatable, relative to the body 126, about the cutter axis 122. In some implementations, the cam 240 includes a tool engagement recess 244, configured to receive a tool (e.g., screwdriver, hand drill, etc.) for rotating the cam 240. Additionally, the cam 240 includes a non-round engagement surface 250 that rotates about the cutter axis 122 as the cam 240 rotates. The cam 240 is configured such that the non-round engagement surface 250 engages the radially-inward surfaces 252 of the inserts 128 as the cam 240 rotates. Due to the non-roundness of the non-round engagement surface 250, as the cam 240 rotates, the non-round engagement surface 250 urges or allows the inserts 128 to move radially relative to the cutter axis 122. Depending on the position of the inserts 128 on the non-round engagement surface 250, rotation of the cam 240 may either urge the inserts 128 radially outwardly, to increase the cutting radius from a first cutting radius, such as first cutting radius $R_1$ to a second cutting radius, such as second cutting radius $R_2$, or allow the inserts 128 to move radially inwardly relative to the cutter axis 122 to decrease the cutting radius.

Desirably, the radially outward adjustment of the all the inserts 128 by the cam 240 is uniform. Accordingly, in one implementation, as shown, the non-round engagement surface 250 has a substantially polygonal shape with a plurality of flat sides, each one engaging a respective one of the inserts 128. In one example, the cutter 220 has three inserts 128 and the non-round engagement surface 250 of the cam 240 is triangular-shaped or hexagonal-shaped. In another example, the cutter 220 has six inserts 128 and the non-round engagement surface 250 of the cam 240 is hexagonal-shaped. Because the sides of the non-round engagement surface 250 are flat, as the cam 240 rotates, the radial distance from the cutter axis 122 of the portion of the sides of the non-round engagement surface 250 engaged with the inserts 128 changes to correspondingly urge or allow radially directed movement of the inserts 128 relative to the body 126. In some embodiments, the sides or corners of the non-round engagement surface 250 of the cam 240 can be rounded such that the non-round engagement surface 250 has a smooth cam profile.

In some implementations, the cutter 220 includes biasing elements (not shown) configured to bias the inserts 128 radially inwardly, such that the biasing elements cause the inserts 128 to move radially inwardly when the cam 240 is rotated to allow radially inward movement of the inserts.

Due to the radially inwardly directed force imparted to the inserts 128 by the workpiece 102 as the workpiece is being cut by the inserts, the non-round engagement surface 250 of the cam 240 remains engaged with the radially-inward surfaces 252 of the inserts 128 as the inserts 128 are radially adjusted so as to provide radial support to the inserts 128 as the inserts 128 are radially adjusted.

Referring to FIGS. 8 and 9, according to one embodiment, the cutting portion 127 of the cutter 320 also includes a plurality of cutting edges 130 each formed on one of a plurality of inserts 128. The inserts 128 are adjustably fixed to the body 126 of the cutter 320 and adjustable to change the cutting radius or cutting diameter of the cutter 320. The inserts 128 can be positioned an equal distance apart from each other circumferentially about a tip 329 or end of the body 126. The inserts 128 each has a radially-inward surface 352. Each insert 128 can be adjustably fixed to the body 126 of the cutter 320 by, at least in part, a respective fastener 132 that extends through a slot 134 formed in the insert 128 and engages the body 126, as described above with reference to FIGS. 3-5. Accordingly, the fastener can be loosened to allow the insert 128 to be moved radially inwardly and outwardly relative to the cutter axis 122, or tightened to fix the insert 128 in place relative to the cutter axis 122.

According to one embodiment, as illustrated in FIGS. 8 and 9, a manual adjustment mechanism of the cutter 320 includes a plurality of shims 360 each positionable between a respective one of the plurality of inserts 128 and the body 126. As mentioned above, due to the radially inwardly directed force imparted to the inserts 128 by the workpiece 102 as the workpiece is being cut by the inserts, radial support may be desirable to support the inserts 128 against the radially inwardly directed force and prevent inadvertent radially inward movement of the inserts 128 due to the radially inwardly directed force. When the inserts 128 are in a radially innermost position relative to the cutter axis 122, as shown in FIG. 8, a central portion 331 of the body 126 of the cutter 320 can provide such radial support. However, as the inserts 128 are adjusted radially outwardly away from the cutter axis 122 and the central portion 331 of the body 126, the central portion 331 of the body 126 no longer provides radial support. Accordingly, one of the shims 360 is positioned between a radially outwardly adjusted insert 128 and the body 126 (e.g., the central portion 331 of the body 126). In some embodiments, each shim 360 has a dimension (e.g., thickness) that is equal to the desired radial adjustment of the plurality of inserts 128 (i.e., the desired amount the inserts 128 will be outwardly radially adjusted). Alternatively, multiple shims 360 can be arranged side-by-side to achieve the desired radial adjustment. In this manner, one or more shims 360, in cooperation with the central portion 331 of the body 126, provides the necessary radial support to prevent inadvertent radially inward movement of an insert 128.

Figure 10:
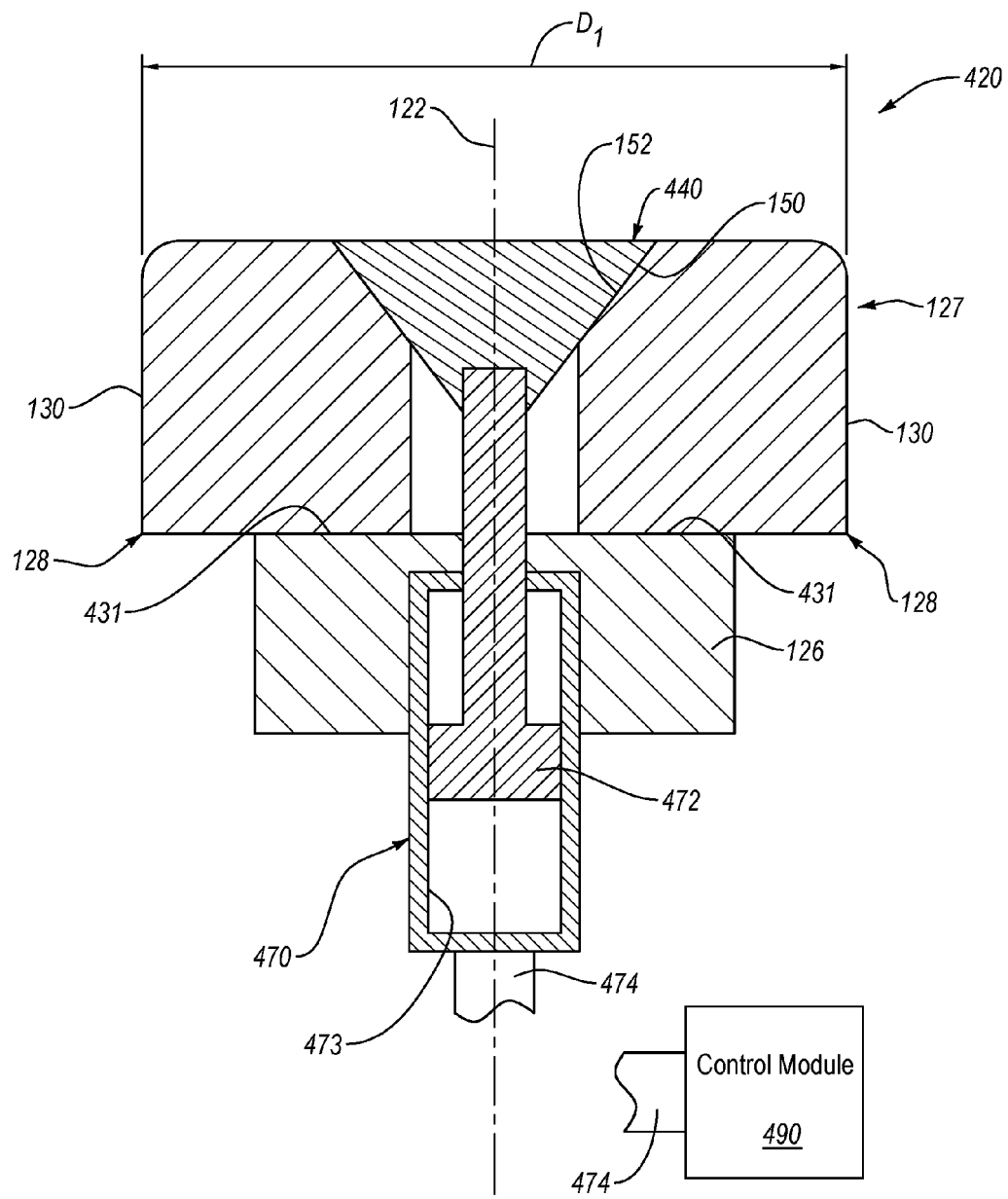
FIG. 10 is a schematic cross-sectional side elevation view of a cutter, shown with inserts in one radial position, according to one or more embodiments of the present disclosure.
Figure 11:
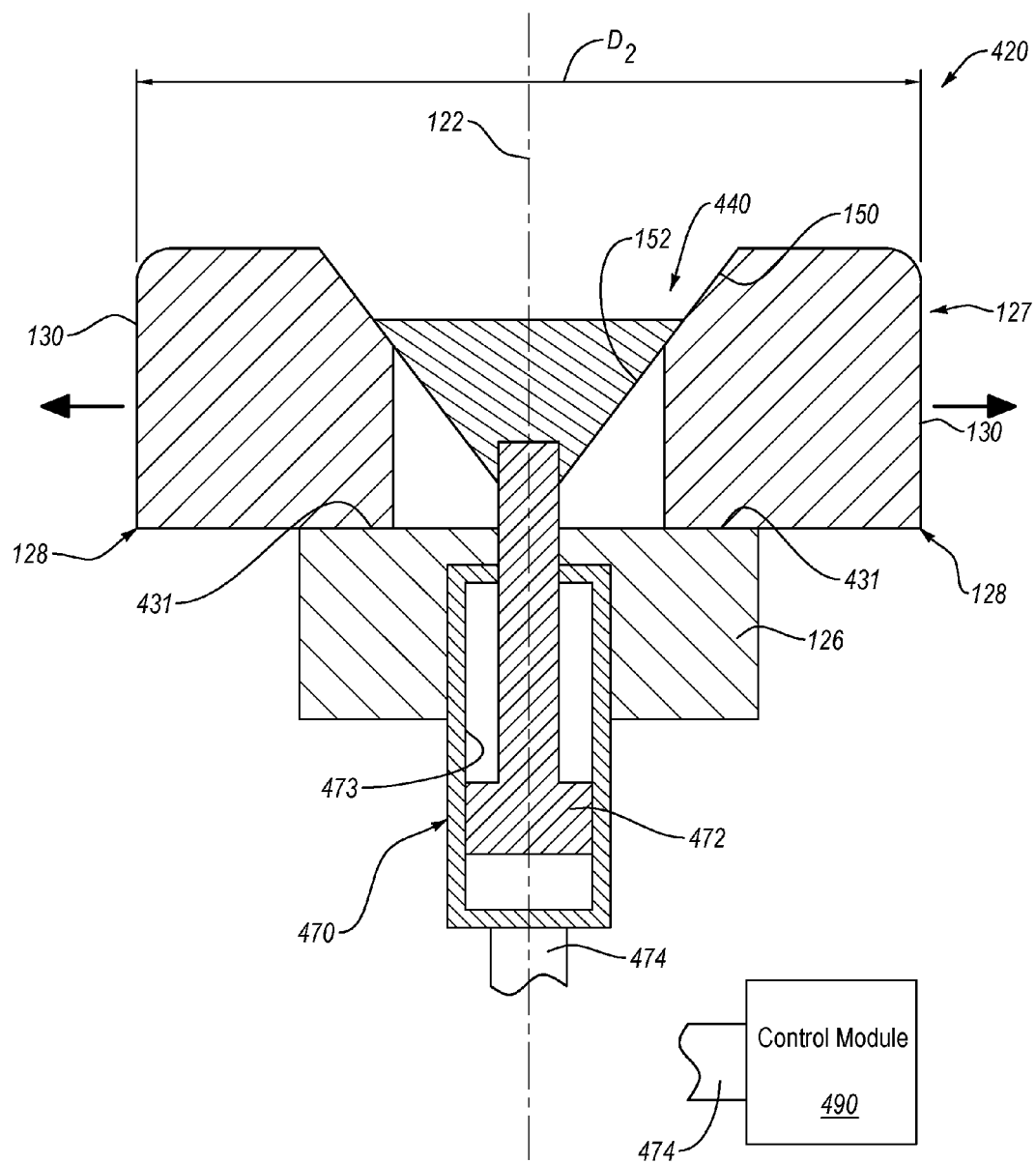
FIG. 11 is a schematic cross-sectional side elevation view of the cutter of FIG. 10, shown with the inserts in another radial position, according to one or more embodiments of the present disclosure.

According to one embodiment, as illustrated in FIGS. 10 and 11, a cutter 420 includes a cutting portion 127 with a plurality of cutting edges 130 each formed on one of a plurality of inserts 128. The inserts 128 are adjustably fixed to the body 126 of the cutter 420 and adjustable to change the cutting radius or cutting diameter of the cutter 420. The inserts 128 can be positioned an equal distance apart from each other circumferentially about a tip or end of the body 126 of the cutter 420.

The cutter 420 also includes an automated adjustment mechanism configured to automatically radially adjust the plurality of inserts 128 relative to the body 126 of the cutter 420. The automated adjustment mechanism includes an electronically-controlled actuator 470 and a wedge 440. Generally, the electronically-controlled actuator 470 is coupled with the inserts 128, via the wedge 440, and is selectively operable to radially move the inserts 128 relative to the body 126 of the cutter 420.

Like the wedge 140 of the cutter 120 of FIGS. 3-5, the wedge 440 is translationally movable along the cutter axis 122 to radially and concurrently move the inserts 128 relative to the cutter axis 122. Similar to the wedge 140, the wedge 440 includes a tapered surface 150 that converges in a direction extending along the body 126 from the tip of the body 126. As the wedge 440 is driven downwardly (as viewed in FIGS. 10 and 11) relative to the body, the tapered surface 150 of the wedge 440 engages the tapered surfaces 150 of the inserts 128. Because the inserts 128 are prevented from downward movement, engagement between the tapered surface 150 of the wedge 440 and the tapered surfaces 152 of the inserts 128 urges the inserts 128 radially outwardly as shown in FIG. 11. In this manner, radially outward adjustment of the position of the inserts 128 can be performed evenly and concurrently. Furthermore, as the inserts 128 are radially outwardly adjusted, the cutting diameter of the cutter 420 increases from a first diameter $D_1$ to a second diameter $D_2$. As the wedge 440 is driven upwardly (as viewed in FIGS. 10 and 11), the tapered surface 150 of the wedge 440 does not prevent radially inward movement of the inserts 128 such that the inserts 128 are allowed to be radially inwardly adjusted. As the inserts 128 are radially inwardly adjusted, the cutting diameter of the cutter 420 decreases. In some implementations, the cutter 420 includes biasing elements (not shown) configured to bias the inserts 128 radially inwardly, such that the biasing elements cause the inserts 128 to move radially inwardly.

Unlike the manual adjustment mechanism of the cutter 120, which manually moves the wedge 140 along the cutter axis 122, movement of the wedge 440 along the cutter axis 122 of the cutter 420 is performed automatically via selective operation and actuation of the electronically-controlled actuator 470. The electronically-controlled actuator 470 includes a piston 472 movable within a cylinder 473 under applied power. The piston 472 is non-movably coupled to the wedge 440. Accordingly, as the piston 472 moves within the cylinder 473, the wedge 440 correspondingly moves. In this manner, the wedge 440 is driven downwardly as the piston 472, under applied power, is moved downwardly within the cylinder 473 and is driven upwardly as the piston 472, under applied power, is moved upwardly within the cylinder 473.

The applied power can be one or more of pneumatic power, hydraulic power, magnetic power, electric power, and the like. Moreover, the application of the applied power to the piston 472, to move the piston 472 within the cylinder 473, is controlled by a control module 480. More specifically, the control module 480 transmits a command to the electronically-controlled actuator 470, via an electronic-signal communication line 474, to actuate the electronically-controlled actuator 470 and move the piston 472 and wedge 440, which radially adjusts the inserts 128. In this manner, the inserts 128 can be radially adjusted on-the-fly, or in-situ, even while the cutter 420 is rotating.

Although the cutter 420 utilizes an electronically-controlled actuator 470 and a wedge 440 to automatically radially move the inserts 128, in other embodiments, the inserts 128 may be automatically radially moved using other features and methods without a wedge and/or electronically-controlled actuator without departing from the essence of the present disclosure.

Although the orbital drilling system 100 is shown to include the cutter 120, co-rotatably coupled to the spindle 113 of the orbital drilling machine 110, which is coupled to the eccentric rotation mechanism 111 of the orbital drilling machine 110, it is recognized that any of the cutters of the present disclosure, such as cutters 220, 320, 420, can be co-rotatably coupled to the spindle 113 in the same manner as cutter 120.

In some embodiments, the control module 480 is further configured to control operation of the orbital drilling machine 110. Accordingly, the control module 480 can be operatively coupled with the orbital drilling machine 110 to transmit commands to the orbital drilling machine that control operational characteristics of the eccentric rotation mechanism 111 and the spindle 113. For example, the control module 480 may be configured to control the start, stop, and rotational rate of the rotation of the eccentric rotation mechanism 111 (i.e., the orbital rotation of the cutter axis 122 about the orbital axis 112) and the spindle 113 (i.e., the cutter co-rotatably coupled to the spindle). Additionally, the control module 480 may be operatively coupled with a robot, coupled to the orbital drilling machine 110 and configured to precisely and automatically position the orbital drilling machine relative to the workpiece 102 to form the hole 104 in the workpiece 102 at a predetermined location, to control operation of the robot.

According to one embodiment, the control module 480 is configured to command the electronically-controlled actuator 470 to move the inserts 128, via movement of the wedge 440, relative to the body 126 or cutter axis 122 of the cutter 420 such that the cutter 420 has a first cutting diameter. The control module 480 is also configured to command the eccentric rotation mechanism 111 to rotate at a first desired orbital rotational speed and command the spindle, and cutter 420 with the first cutting diameter, to rotate at a first desired cutting rotational speed. Furthermore, the control module 480 can be configured to command a robot to position the eccentric rotation mechanism 111 relative to the workpiece 102, such that the orbital axis 112 is concentric with a center of the hole 104 to be formed in the workpiece 102 and the inserts 128 of the cutter 420 with the first cutting diameter cut the hole 104, with a first hole diameter, in the workpiece 102. After the hole 104 with the first hole diameter is cut in the workpiece 102, the control module 480 is configured to command the electronically-controlled actuator 470 to move the inserts 128, via movement of the wedge 440, relative to the body 126 or cutter axis 122 of the cutter 420 such that the cutter 420 has a second cutting diameter, larger than the first cutting diameter. The control module 480 is further configured to command the eccentric rotation mechanism 111 to rotate at a second desired orbital rotational speed and command the spindle, and cutter 420 with the second cutting diameter, to rotate at a second desired cutting rotational speed. Additionally, the control module 480 can command the robot to position the eccentric rotation mechanism 111 relative to the workpiece 102, such that the orbital axis 112 is concentric with a center of the hole 104 with the first hole diameter and the inserts 128 of the cutter 420 with the second cutting diameter cuts the material 104 to enlarge the hole 104 from the first hole diameter to a second hole diameter, larger than the first hole diameter.

Although the orbital drilling machine 110 of the illustrated embodiment has been described as having an offset OS between the orbital axis 112 and the cutter axis 122 that is non-adjustably fixed, in some embodiments, the cutter, with an adjustable cutting diameter, of the present disclosure can be used with conventional orbital drilling machines having an adjustable offset OS between the orbital axis 112 and the cutter axis 122. For example, users owning an existing orbital drilling machine, with an adjustable offset OS, may desire to use the cutter of the present disclosure, in view of the various advantageous features of the cutter, with their existing orbital drilling machine instead of obtaining (e.g., purchasing) a new orbital drilling machine, with a fixed offset OS, despite the advantages an orbital drilling machine with a non-adjustably fixed offset OS has over an orbital drilling machine with an adjustable offset OS. Such users may form holes in a workpiece by adjustably fixing the offset OS of their conventional orbital drilling machine and adjusting the cutting diameter of the cutter as described herein. Alternatively, as one example, users may form holes in a workpiece by using the adjustable offset OS of a conventional orbital drilling machine to make relatively rough adjustments to the size of a hole and using the adjustable cutting diameter of the cutter to make relatively fine or precise adjustments to the size of the hole.

Figure 12:
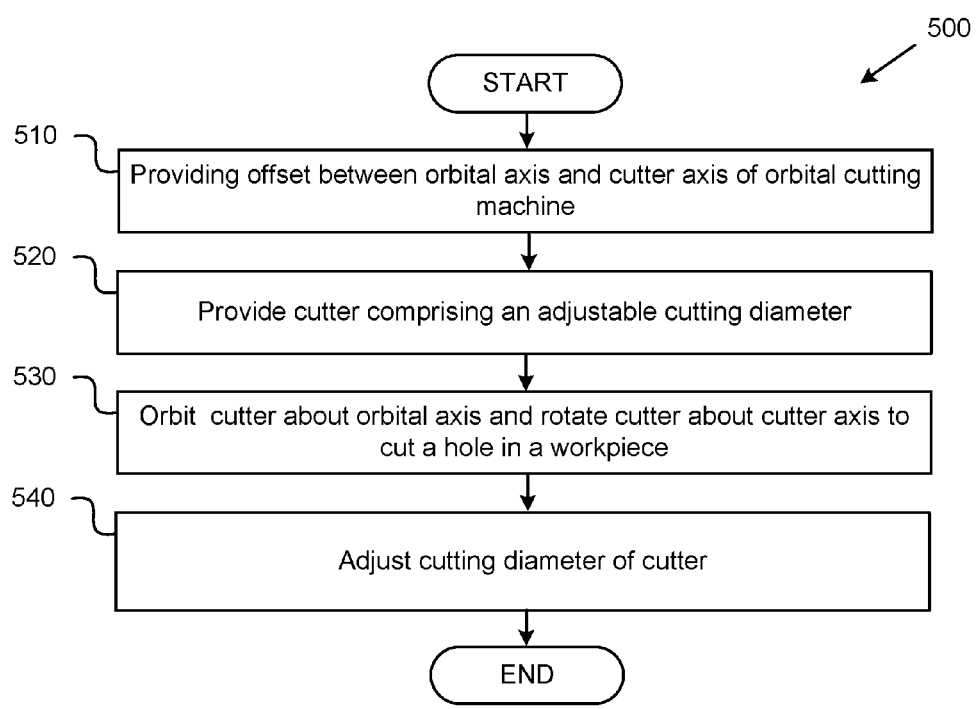
FIG. 12 is a block diagram illustrating a method of forming a hole in a workpiece, according to one or more embodiments of the present disclosure.

Referring now to FIG. 12, according to one embodiment, a method 500 of forming a hole in a workpiece, such as with the orbital drilling system 100 of the present disclosure, includes providing an offset between an orbital axis and a cutter axis of an eccentric rotation mechanism at 510. In some implementations, the offset between the orbital axis and the cutter axis is non-adjustably fixed. Additionally, the method 500 includes, at 520, providing a cutter with an adjustable cutting diameter, for cutting material in a workpiece, where the cutter orbits about the orbital axis and rotates about the cutter axis. The method 500 further includes orbiting the cutter about the orbital axis and rotating the cutter about the cutter axis to cut a hole in a workpiece at 530. Before or after cutting the hole in the workpiece, the method 500 also includes adjusting the cutting diameter of the cutter at 540. In one example, the cutting diameter of the cutter is adjusted before cutting an initial hole, having a hole diameter proportional to the adjusted cutting diameter, in a workpiece. According to another example, the cutting diameter of the cutter is adjusted (e.g., increased from a first cutting diameter to a second cutting diameter) after cutting an initial hole, with a first hole diameter, in the workpiece and cutting the hole in the workpiece at 530 includes enlarging the hole diameter of the initial hole cut in the workpiece, to a second hole diameter larger than the second cutting diameter and larger than the first hole diameter, with the cutter having the adjusted cutter diameter.

In some implementations of the method 500, adjusting the cutting diameter of the cutter at 540 includes moving a plurality of cutting edges, collectively defining the cutting diameter of the cutter, away from or towards the cutter axis. According to some examples, the plurality of cutting edges of the cutter are moved manually. In other examples, the plurality of cutting edges of the cutter are moved automatically or in an automated manner, such as on-the-fly as the cutter rotates about the cutter axis.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An orbital drilling system, comprising:
    an orbital drilling machine, comprising:
        a spindle, rotatable about a cutter axis; and
        an eccentric rotation mechanism, coupled to the spindle and configured to orbit the spindle about an orbital axis, offset from the cutter axis; and
    a cutter, co-rotatably coupled to the spindle and comprising a plurality of cutting edges, collectively defining a cutting diameter of the cutter, wherein the cutting diameter of the cutter is adjustable.

2. The orbital drilling system according to claim 1, wherein the cutter further comprises a body and a plurality of inserts adjustably fixed to the body, each of the plurality of inserts defining one of the cutting edges and being radially adjustable relative to the body to adjust the cutting diameter of the cutter.

3. The orbital drilling system according to claim 2, wherein the cutter further comprises a manual adjustment mechanism, configured to manually radially adjust the plurality of inserts relative to the body.

4. The orbital drilling system according to claim 3, wherein the manual adjustment mechanism comprises a cam, comprising a non-round engagement surface configured to:
engage the plurality of inserts;
upon rotation of the cam in a first rotational direction, urge the plurality of inserts radially outwardly relative to the body of the cutter; and
upon rotation of the cam in a second rotational direction, opposite the first rotational direction, allow the plurality of inserts to be moved radially inwardly relative to the body of the cutter.

5. The orbital drilling system according to claim 3, wherein the manual adjustment mechanism comprises a wedge, comprising a tapered surface configured to:
engage the plurality of inserts;
upon translational movement of the wedge relative to the body in a first translational direction, parallel to the cutter axis, urge the plurality of inserts radially outwardly relative to the body of the cutter; and
upon translational movement of the wedge relative to the body in a second translational direction, opposite the first translational direction, allow the plurality of inserts to be moved radially inwardly relative to the body of the cutter.

6. The orbital drilling system according to claim 3, wherein the manual adjustment mechanism comprises a plurality of shims, each positionable between a respective one of the plurality of inserts and the body to support the insert following a manual radial adjustment of the insert.

7. The orbital drilling system according to claim 6, wherein the plurality of shims each has a dimension equal to a desired radial adjustment of the plurality of inserts.

8. The orbital drilling system according to claim 3, wherein the cutter further comprises a plurality of fasteners, each configured to adjustably fix a respective one of the plurality of inserts to the body of the cutter.

9. The orbital drilling system according to claim 8, wherein:
each of the plurality of inserts comprises a slot, through which a respective one of the plurality of fasteners extends to adjustably fix the insert to the body of the cutter; and
each fastener moves translationally along the slot of a respective insert as the insert is radially adjusted relative to the body.

10. The orbital drilling system according to claim 2, wherein the cutter further comprises an automated adjustment mechanism, configured to automatically radially adjust the plurality of inserts relative to the body of the cutter.

11. The orbital drilling system according to claim 10, wherein the automated adjustment mechanism comprises an electronically-controlled actuator, coupled with the plurality of inserts and selectively operable to radially move the plurality of inserts relative to the body of the cutter.

12. The orbital drilling system according to claim 11, wherein:
the automated adjustment mechanism further comprises a wedge, comprising a tapered surface configured to:
engage the plurality of inserts;
upon translational movement of the wedge relative to the body in a first translational direction, parallel to the cutter axis, urge the plurality of inserts radially outwardly relative to the body of the cutter; and
upon translational movement of the wedge relative to the body in a second translational direction, opposite the first translational direction, urge the plurality of inserts to be moved radially inwardly relative to the body of the cutter; and
the wedge is coupled to the electronically-controlled actuator and translationally movable relative to the body via selective operation of the electronically-controlled actuator.

13. The orbital drilling system according to claim 11, wherein:
the automated adjustment mechanism further comprises a control module, operatively coupled with the electronically-controlled actuator; and
the control module is configured to direct the electronically-controlled actuator to radially move the plurality of inserts relative to the body of the cutter.

14. The orbital drilling system according to claim 13, wherein:
the control module is operatively coupled with the orbital drilling machine to control rotation of the spindle and cutter about the cutter axis and orbital rotation of the spindle about the orbital axis;
the control module is configured to:
direct the electronically-controlled actuator to radially move the plurality of inserts relative to the body of the cutter such that the cutter has a first cutting diameter;
control rotation of the spindle and cutter with the first cutting diameter about the cutter axis and orbital rotation of the spindle about the orbital axis to form a hole in a workpiece having a first hole diameter greater than the first cutting diameter;
direct the electronically-controlled actuator to radially move the plurality of inserts relative to the body of the cutter such that the cutter has a second cutting diameter larger than the first cutting diameter; and
control rotation of the spindle and cutter with the second cutting diameter about the cutter axis and orbital rotation of the spindle about the orbital axis to enlarge the hole in the workpiece from the first hole diameter to a second hole diameter larger than the first hole diameter.

15. The orbital drilling system according to claim 1, wherein the offset between the cutter axis and the orbital axis is non-adjustably fixed.

16. A method of forming a hole in a workpiece, comprising:
providing an offset between an orbital axis, about which a cutter orbits, and a cutter axis, about which the cutter rotates;
adjusting a cutting diameter of the cutter;
rotating the cutter about the cutter axis to cut material in the workpiece; and
while rotating the cutter about the cutter axis to cut material in the workpiece, orbiting the cutter about the orbital axis to form a hole in the workpiece having a first hole diameter greater than the cutting diameter.

17. The method according to claim 16, wherein:
the cutter comprises a plurality of cutting edges, collectively defining the cutting diameter of the cutter; and adjusting the cutting diameter of the cutter comprises manually moving the plurality of cutting edges radially away from or radially towards the cutter axis.

18. The method according to claim 16, wherein:
the cutter comprises a plurality of cutting edges, collectively defining the cutting diameter of the cutter; and
adjusting the cutting diameter of the cutter comprises automatically moving the plurality of cutting edges radially away from or radially towards the cutter axis.

19. The method according to claim 18, wherein adjusting the cutting diameter of the cutter comprises moving the plurality of cutting edges radially away from or radially towards the cutter axis on-the-fly while the cutter rotates about the cutter axis.

20. The method according to claim 16, wherein the cutting diameter of the cutter is a first cutting diameter, the method further comprising:
adjusting the first cutting diameter of the cutter to a second cutting diameter different than the first cutting diameter; and
while rotating the cutter about the cutter axis to cut material in the workpiece, orbiting the cutter about the orbital axis to form a hole in the workpiece having a second hole diameter greater than the second cutting diameter and different than the first hole diameter.

21. The method according to claim 16, further comprising non-adjustably fixing the offset between the orbital axis and the cutter axis.

* * * * *